United States Patent
DeLuca et al.

(10) Patent No.: US 9,876,765 B2
(45) Date of Patent: Jan. 23, 2018

(54) TRANSMITTING A HIDDEN COMMUNICATION

(71) Applicant: International Business Machines Corporation, Armonk, NY (US)

(72) Inventors: Lisa Seacat DeLuca, Baltimore, MD (US); Geetika T. Lakshmanan, Winchester, MA (US); Michael Muller, Medford, MA (US)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 14/157,611

(22) Filed: Jan. 17, 2014

(65) Prior Publication Data

US 2015/0207781 A1  Jul. 23, 2015

(51) Int. Cl.
| | |
|---|---|
| *H04L 29/00* | (2006.01) |
| *H04L 29/06* | (2006.01) |
| *H04W 12/02* | (2009.01) |
| *H04L 12/58* | (2006.01) |
| *H04L 9/34* | (2006.01) |
| *G06F 17/27* | (2006.01) |
| *G06F 21/62* | (2013.01) |
| *H04W 4/18* | (2009.01) |
| *H04W 4/22* | (2009.01) |

(52) U.S. Cl.
CPC ........... *H04L 63/0421* (2013.01); *H04L 9/34* (2013.01); *H04L 51/063* (2013.01); *H04L 51/36* (2013.01); *H04L 63/0428* (2013.01); *H04W 12/02* (2013.01); *G06F 17/27* (2013.01); *G06F 21/6245* (2013.01); *H04W 4/18* (2013.01); *H04W 4/22* (2013.01)

(58) Field of Classification Search
CPC .................................................... H04W 12/02
See application file for complete search history.

(56) References Cited

U.S. PATENT DOCUMENTS

| | | | |
|---|---|---|---|
| 3,974,338 A | 8/1976 | Luzier et al. | |
| 4,644,347 A | 2/1987 | Lucas et al. | |
| 4,811,383 A | 3/1989 | Hashimoto | |
| 5,257,307 A | 10/1993 | Ise | |
| 5,333,266 A * | 7/1994 | Boaz | H04L 51/066 379/100.08 |
| 5,905,724 A | 5/1999 | Carson et al. | |
| 6,473,621 B1 * | 10/2002 | Heie | H04M 1/2472 340/7.31 |
| 6,950,986 B1 | 9/2005 | Jacobi, Jr. et al. | |
| 7,890,860 B1 * | 2/2011 | Thrasher et al. | 715/260 |

(Continued)

OTHER PUBLICATIONS

Frazier et al., "Your Teenager: 'What you need to know'", A PowerPoint Presentation, Coral Springs Charter School (Date not available: latest reference in file is 2006).

(Continued)

*Primary Examiner* — Madhuri Herzog
(74) *Attorney, Agent, or Firm* — Alexis N. Hatzis; Robert C. Bunker

(57) ABSTRACT

A first communication element is received on a communicating device. A defined mapping is identified based on an identification of a recipient device. The first communication element is mapped to a second communication element based on the defined mapping. The mapped communication element is provided to the recipient device.

18 Claims, 8 Drawing Sheets

(56) References Cited

U.S. PATENT DOCUMENTS

| | | | | |
|---|---|---|---|---|
| 8,769,286 | B2* | 7/2014 | White | H04L 51/24 705/70 |
| 2002/0163423 | A1 | 11/2002 | Kondo | |
| 2003/0003931 | A1* | 1/2003 | Silventoinen | H04L 12/583 455/466 |
| 2007/0086587 | A1* | 4/2007 | Farahat | G06Q 10/107 380/28 |
| 2008/0235336 | A1* | 9/2008 | Stern et al. | 709/206 |
| 2009/0006565 | A1* | 1/2009 | Velusamy et al. | 709/206 |
| 2010/0003959 | A1* | 1/2010 | Coppage et al. | 455/404.2 |
| 2010/0088378 | A1* | 4/2010 | Asawa | H04L 12/587 709/206 |
| 2011/0213850 | A1* | 9/2011 | Umeshima et al. | 709/206 |
| 2012/0034939 | A1* | 2/2012 | Al-Omari | G06F 17/2264 455/466 |
| 2013/0012154 | A1* | 1/2013 | Ramos | H04L 51/20 455/404.2 |
| 2015/0095127 | A1* | 4/2015 | Patel | G06Q 30/0214 705/14.16 |

OTHER PUBLICATIONS

Artz, "Digital Steganogaphy: Hiding Data within Data," IEEE Internet Computing, May, Jun. 2001, http://computer.org/internet/, pp. 75-80.

Huffman, A Method for the Construction of Minimum-Redundancy Codes, Proceedings of the I.R.E., Sep. 1952, pp. 1098-1101.

Mell et al., "The NIST Definition of Cloud Computing", Version 15, Oct. 7, 2009.

Beal, "Text Messaging and Online Chat Abbreviations", Posted: Feb. 26, 2010, Accessed on Aug. 5, 2013, pp. 1-51, http://www.webopedia.com/quick_ref/textmessageabbreviations.asp.

Chan, "How to Send Secret Encrypted Text Messages on Your iPhone (http://gizmodo.com/5898495/how-to-send -secret-encrypted-text-messages-on-youriphone)", accessed on Nov. 20, 2013, pp. 1-4.

Ngo et al., "Dynamic Key Cryptography and Applications", International Journal of Network Security, vol. 10, No. 3, pp. 161-174, May 2010.

* cited by examiner

TRANSMITTING A HIDDEN COMMUNICATION

FIELD OF THE INVENTION

The present disclosure generally relates to electronic communication, and more particularly, to altering electronic communications based on the content of the communication.

BACKGROUND

As electronic devices and their use become more pervasive, particularly in public settings, there is an increased desire for privacy in electronic communications. Electronic devices like cell phones frequently display confidential communications viewable by an onlooker who is not a sender or an intended recipient of the communication. It may be desirable, therefore, to provide privacy safeguards for confidential communications.

BRIEF SUMMARY

According to an aspect of the present disclosure, a computer implemented method for providing a hidden communication receives a first communication element in a computerized communications application of a communicating device. The method identifies a defined mapping based on an identification of a recipient device. The method maps the first communication element to a second communication element based on the defined mapping, and provides the second communication element to the recipient device.

According to a further aspect of the present disclosure, a computer system for providing a hidden communication includes a computer having a processor and a computer-readable storage device. The system also includes a program embodied on the storage device for execution by the processor. The program has a plurality of program modules. An input module receives a first communication element in a computerized communications application. An identifying module is configured to identify a defined mapping based on an identification of a recipient device. A mapping module is configured to map the first communication element to a second communication element based on the defined mapping. A providing module is configured to provide the second communication to the recipient device.

According to a further aspect of the present disclosure, a computer program product for providing a hidden communication includes a computer-readable storage device having program code embodied therewith. The program code is executable by a processor to perform a method. The method receives, by the processor, a first communication element in a computerized communications application from a communicating device. The method identifies, by the processor, a defined mapping based on an identification of a recipient device. The method maps, by the processor, the first communication element to a second communication element based on the defined mapping. The method provides, by the processor, the second communication element to the recipient device.

DETAILED DESCRIPTION

Figure 1A:
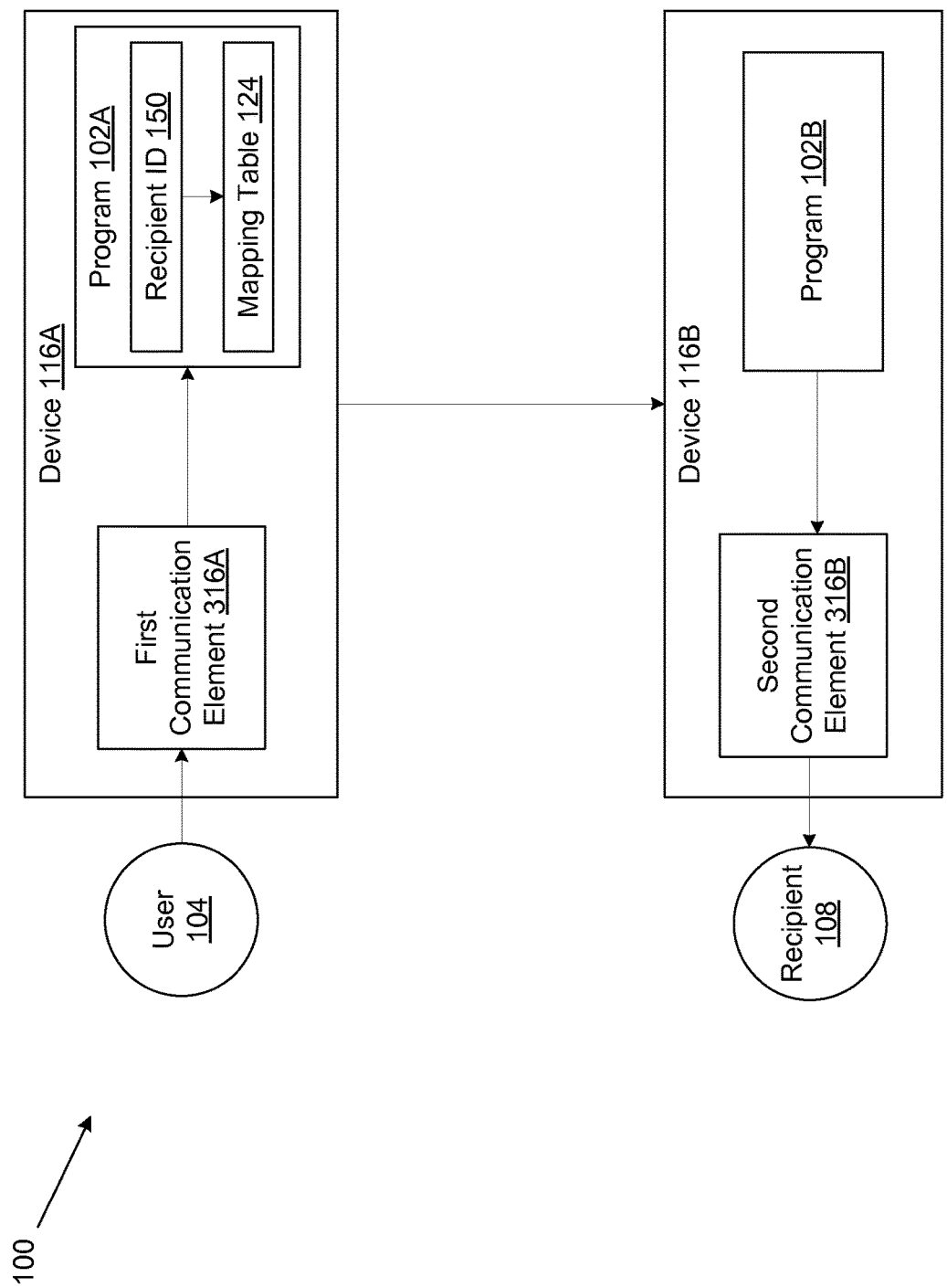
FIG. 1A is a schematic block diagram depicting components of a system for providing a hidden communication from a first device to a second device, according to an aspect of the present disclosure.

FIG. 1A is a schematic block diagram depicting components of a communications system 100 for providing a hidden communication from a first device to a second device, according to an aspect of the present disclosure. The communications system 100 may include one or more devices 116A/116B capable of communicating with one another via, for example, a communications network. One or more users, including a user 104 and a recipient 108, may operate devices 116A/116B, respectively.

In various embodiments of the present disclosure, the devices 116A/116B, which are described in more detail below with respect to FIG. 5, may be laptop computers, tablet computers, netbook computers, personal computers (PCs), a desktop computers, a personal digital assistants (PDAs), a smart phones, or any programmable electronic device capable of communicating with a second device of such type, and supporting the functionality required of embodiments of the invention. Each such device may include means for input, such as a touch screen, a microphone (and include, for example, speech recognition software that transcribes vocal input through the microphone), and other input features.

Figure 5:
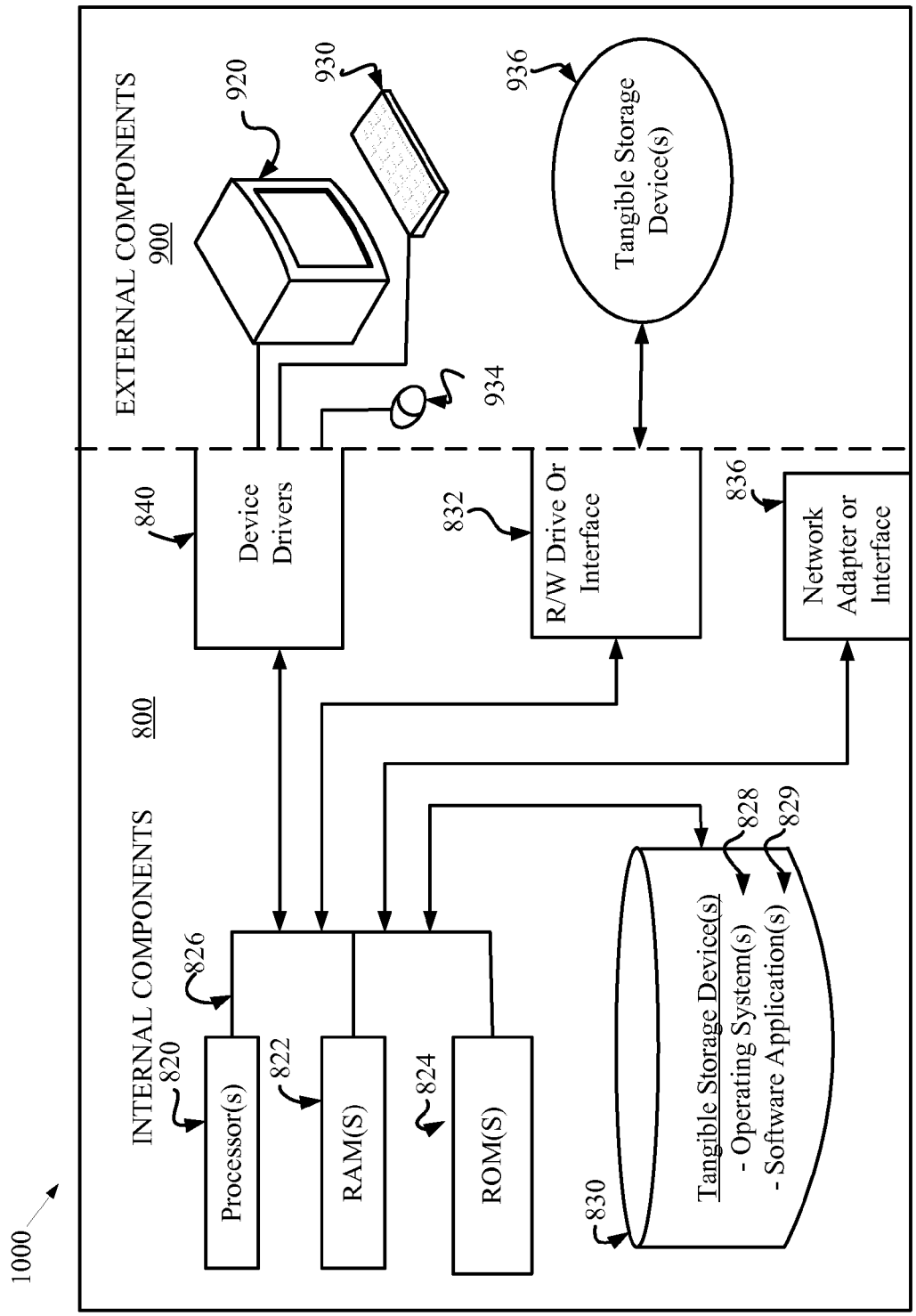
FIG. 5 is a schematic block diagram of a computer system, according to an aspect of the present disclosure.

According to aspects of the present disclosure, each of the devices 116A/116B may have a program 102A/102B embodied thereon, as described in greater detail with respect to FIG. 5. The program 102A may operate generally to receive a communication, such as first communication element 316A, described in more detail below, entered into a device 116 by, for example, a user 104, and to provide the communication to the device 116B. The program 102B may operate generally to receive a communication from program 102A, for example, the second communication 316B, described in more detail below, and to, for example, display the communication on the device 116B to, for example, a recipient 108. The programs 102A/102B may also provide a variety of other functionalities on the devices 116A/116B, including, without limitation: communications functionality, user interfaces, and I/O. They programs 102A/102B may also, for example, facilitate receipt, mapping, and communication of the first and second communication elements 316A/316B, which are described in more detail below. In various other embodiments, the programs 102A/102B may facilitate functioning of hardware features (e.g. cameras, microphones) and/or software features (e.g. data processing) of the devices 116A/116B respectively. For example, the program 102A may activate a recording feature of the device 116A may and provide it to another component of the communications system 100.

In various embodiment of the disclosure, the devices 116A and 116B may include first and second communication elements 316A and 316B, respectively. Communication element 316A may represent information provided to/entered into device 116A by, for example, the user 104, and the communications element 316B may represent information provided to the device 116B, and it corresponds to the communication element 316A.

In various embodiments of the present disclosure, the types of the first and second communication elements 316A/316B may include, without limitation:

- Text-based communications such as email, instant message, text message (SMS), status update on a social network existing on one or more computers such an online social network;
- Audio-based communications such as a voicemail or a phone call;
- Video-based communications such as a video message or a video stream;
- Graphics-based communications such as digital images or digital symbols;
- A stress indicator (which may be, for example, a text string, associated with a stress response. For example, "help" may be a stress indicator, and if typed along with other text, or spoken in addition to other words, may trigger a corresponding response which may be, for example, placing a call to an emergency operator).
- Combinations of two or more of the above (for example, an email may contain text, audio, video, and graphics communications).

Figure 2:
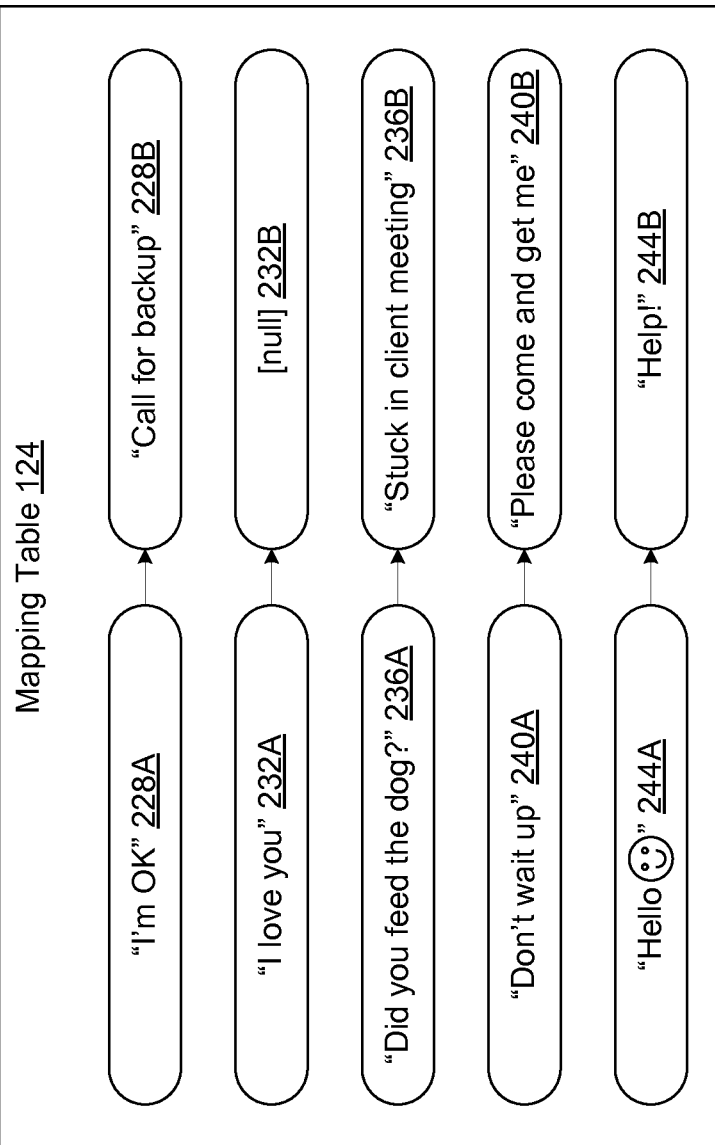
FIG. 2 illustrates a mapping table depicted in FIGS. 1A-B, according to an aspect of the present disclosure.

In aspects of the disclosure where the first communication element 316A contains or is coupled with a stress indicator, the coupling may be performed through an automated means, such that the user 104 need not specify the stress indicator. In one example, the user 104 may speak into a smart phone (the device 116A) "please don't wait up", where "please" may be defined by default or by the user 104 to be a stress indicator, and "don't wait up" may be a mapped message 240A (FIG. 2). The program 102A may automatically generate a text message (second communication element 316B) to a recipient device 116B indicated by the device 116A, that reads "please come and get me" 240B (FIG. 2). Alternatively, or in addition thereto, the program 102A may obtain (and/or the device 116A may provide) global positioning satellite (GPS) coordinates of the device 116A (or another device) and provide it to the recipient device 116B (or to another recipient other than the recipient 108 of the second communication element 316B).

A communication element may correspond to all or a segment of a communication unit of a communication type described above. For example, a communication element may be, without limitation:

- In a text-based communication type: a character, symbol, word, sentence, paragraph or other identifiable segment thereof;
- In an audio-based communication type: a vowel, a word, a sentence, a or digital audio in a time interval (e.g. the first 2 seconds of a phone call);
- In a video-based communication type: a frame or a series of contiguous or discontiguous frames;
- In a graphics-based communication type: a digital image, a series of digital images, or a set of constituent parts of such digital images (e.g. pixels);
- Or combinations thereof.

The program 102A of the first device 116A may perform mapping functions for communication elements communicated between the devices 116A/116B, for example, first and second communication elements 316A/316B. For example, the program 102A may alter, annotate, or replace the informational content of a communication element received from device 116A with a different informational content and provide a corresponding communication element to device 116B. Mapping functions of the program 102A may be facilitated in part through using a mapping table 124. The program 102A may select the mapping table 124 from among a set of available mapping tables, based on a selection communicated to the program 102A through the device 116A. This selection may be based on a preconfigured or preselected set of recipients 108 and/or mapping tables 124, which may be implemented using a user interface (FIG. 3) on the device 116A.

The program 102A may determine whether a mapping is performed and which mapping table 124 should be used, as follows:

- The first communication element 316A may include a mapping indicator. For example, the recipient ID 150 may be appended to the first communication element 316A as the indicator prior to the program 102A receiving the first communication element 316.
- The first communication element 316A may be one of a predefined set of communication elements that require a mapping;
- The device 116A may be one of a predefined set of communicating devices whose communication elements may require a mapping;
- The device 116B may be one of a predefined set of communicating devices for which incoming communication elements may require a mapping;
- A combination of the above.

Accordingly, in an illustrative example, selection of a mapping table 124 may be as follows: the program 102A may receive input from user 104 of device 116A specifying a recipient ID 150 in addition to the first communication element 316A. The recipient ID 150 may correspond to a recipient such as the recipient 108, and/or to a device, such as the device 116B. Based on the specified recipient ID 150, the program 102A may select a corresponding mapping table 124. The first communication element 316A itself may contain an indicator corresponding to a recipient ID 150, and the program 102A may select a corresponding mapping table 124.

In aspects of the present disclosure, the program 102A may provide the device 116B with a communication that includes the first communication element 316A and a mapping indicator; or the second communication element 316B; or the first communication element and the second communication elements 316A/316B, as follows.

In one aspect of the present disclosure, the first communication element 316A and a mapping indicator may be, for example, a text message containing an emoticon that is predefined as a mapping indication by the program 102A. In one example, this may be useful where the mapping functionality is to be performed by the program 102B on the device 116B. Accordingly, the program 102A may provide the device 116B with the first communication element and the mapping indicator, and the device 116B may perform the mapping functions via, for example, the program 102B. In one example, it may be desirable for the recipient 108 to wait until the recipient 108 is in a private setting before the mapping is performed. It may be desirable, therefore, for the recipient 108 having access and control over the device 116B to decide whether or not to carry out the mapping.

In another aspect of the present disclosure, the provided communication may include the second communication element 316B, but not the first communication element 316A. This may be useful when, for example, there is a concern about confidentiality of the communication on the device 116A end (for example, if unauthorized persons/devices can ascertain the user 104 speak her message or can see what the user 104 is typing on the device 116A), but the user 104 is not concerned about confidentiality on the recipient's 108 device 116B (for example, the recipient 108 may be an emergency response center operator and there may be no need to keep the mapped communication confidential on the operator's end). According to a further example, this may be useful where the mapping function of the program 102A is performed prior to providing the communication to the device 116B.

According to a further aspect of the present disclosure, the communication provided by the program 102A may alternatively include both the first communication element 316A and the second communication element 316B. This may be useful, for example, where the device 116B can modify the mapping functionality of the output of the device 116A and the program 102A. For example, the program 102B on the second device 116B may have filtering functionality that generates custom alerts based on receiving a predefined set of hidden communications.

Figure 1B:
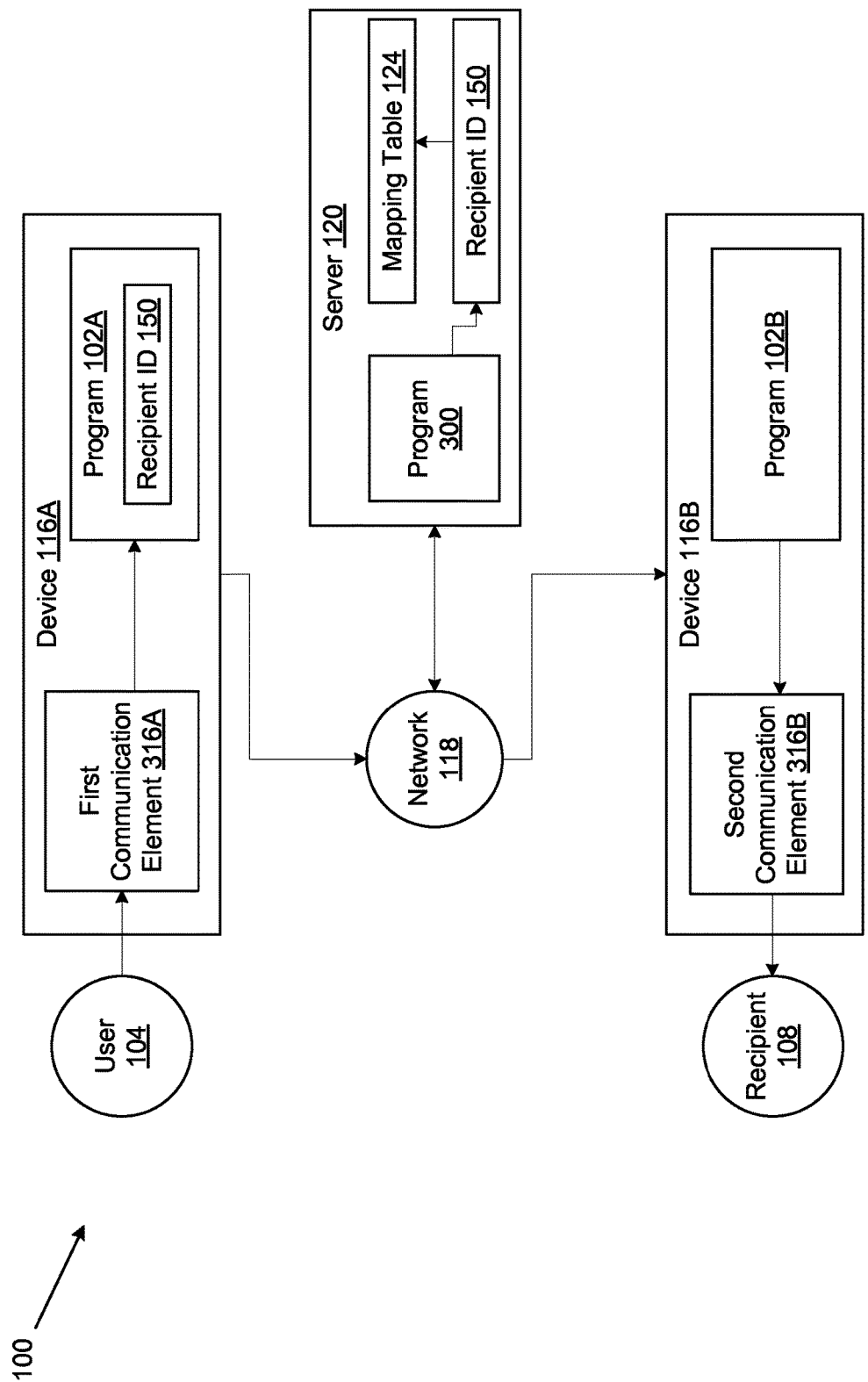
FIG. 1B is a schematic block diagram depicting components of a system for providing a hidden communication from a first device to a second device via a server, according to an aspect of the present disclosure.

FIG. 1B is a schematic block diagram depicting components of the communications system 100 of FIG. 1A, where a hidden communication from a first device is provided to a second device via a server 120, where the devices 116A/116B and the server 120 are interconnected via a network 118. The server 120, which is described in more detail below with respect to FIG. 5, may be a laptop computer, personal computer (PC), a desktop computer, or any programmable electronic device capable of network functionality and communicating with the devices 116A/116B via the network 118, and supporting the functionality required of embodiments of the invention.

In various embodiments, the network 118 can be, for example, a local area network (LAN), a wide area network (WAN) such as the Internet, or a combination of the two, and can include wired, wireless, or fiber optic connections. In general, the network 118 can be any combination of connections and protocols that will support communications between the server 120 and the devices 116A/116B.

The server may include a program 300 that performs the mapping functionalities described as being performed by the program 102A in connection with FIG. 1A. According to this embodiment, the program 102A may receive the first communication element 316A as input (for example, from the user 104), and may communicate the first communication element 316A to the program 300 on the server 120 via the network 118. The program 102A may also communicate the recipient ID 150 designated by the device 116A. Upon receiving the first communication element 116A, the program 300 may map it to the second communication element 116B in the same manner as described above in FIG. 1A with respect to the program 102A; the program 300 may determine whether a mapping is required and may identify corresponding mapping tables 124. The program 300 may communicate the second communication element to the second device 116B.

Accordingly, in various embodiments of the present disclosure, the mapping functionality described in connection with embodiments of the present disclosure may reside may reside exclusively on the device 116A (e.g. the program 102A), the server 120 (the program 300), or on the device 116B (e.g. the program 102B), or it may be distributed across these and/or other devices in the communications system 100.

FIG. 2 illustrates the mapping table 124 depicted in FIGS. 1A-B, according to an aspect of the present disclosure. As described above, the mapping table 124 may be used by the program 102A (or the program 300 on the server 120) for altering or replacing the informational content of a communication element, such as the first communication element 316A received as an input to the program 102A on the device 116A, with a different informational content and provide a communication element, such as the second communication element 316B, to the device 116B. The mapping table 124 may include one or more exemplary mapping entries, where each entry includes a first element and mapped second element (wherein the mapped element is used in the second communication element 316B to the device 116B), as follows:

"I'm OK" 228A having a corresponding mapping of "Call for Backup" 228B;

"I love you" 232A having a corresponding mapping of [null] 232B. This entry is included for illustrative purposes to demonstrate that some texts/communication elements may not have a corresponding second communication element 316B in the Mapping Table 124. Therefore, although the text 232A is listed as an entry of the Mapping Table 124, embodiments of the present disclosure may have no entries for such communication elements that have no defined second communication element. In the present example, a "null" value indicates that no corresponding second communication element exits for the text 232A.

"Did you feed the dog?" 236A having a corresponding mapping of "Stuck in client meeting" 236B;

"Don't wait up" 240A having a corresponding mapping of "Please come and get me" 240B;

"Hello" and an emoticon symbol 244A having a corresponding mapping of "Help!" 334B, where the emoticon is a mapping indicator; i.e., the emoticon is an element of the entry 244A and indicates that the device 116A has indicated that a mapping of the entry is required. An alternate communication that includes "Hello" without an emoticon, for example, may be treated as an ordinary communication and may not have, in this example, a corresponding mapping.

Mapped elements of the entries of the mapping table 124 need not be of the same communication type. For example, the first element "I'm OK" 228A may be a text message, and its corresponding second element "Call for backup" 228B may be an email message or audio data. For example, a media type indicator, not shown, may be included in the corresponding first elements of the mapping table 224, indicating the media type of, for example, the first second communication element 316A, and corresponding media types of the corresponding second communication elements 316B. The program 102A may map the first and second communication elements 316A/316B according to the specified media type elements.

Figure 3:
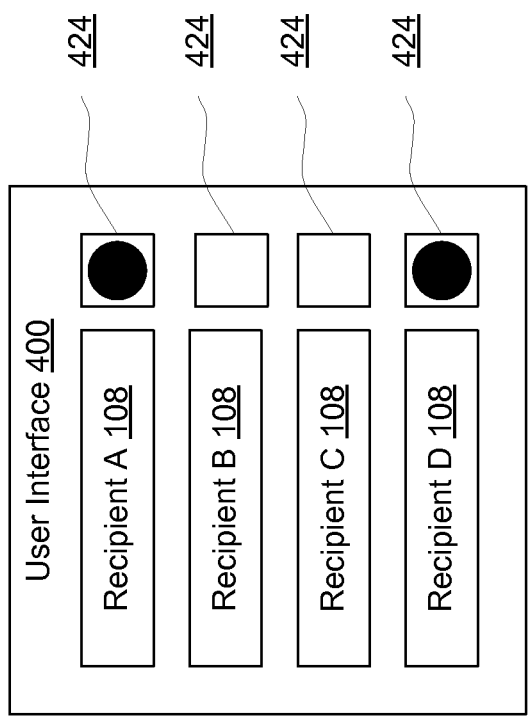
FIG. 3 is a schematic block diagram of a user interface, according to an aspect of the present disclosure.

FIG. 3 illustrates an exemplary user interface (UI) 400, according to an aspect of the present disclosure. The UI 400 may be presented to the user 104 (FIG. 1A) through, for example, the program 102A on the device 116A. The UI 400 may include selection fields 424 associated with one or more recipients 108, including, for example, recipients A, B, C and D. The user 104 may select, for example, recipient A and recipient D, as recipients of the first communication element 116A, who should receive a corresponding second communication element 116B that is mapped. The selection made using the UI 400 may be used by the program 102A (or the program 300 on the server 120) to identify corresponding recipient IDs 150 and corresponding mapping tables 124. The UI 400 may alternatively or additionally allow the user 104 to determine which of the recipients 108, if any, should receive the first communication element 316A, the second communication element 316B, or a combination thereof. The UI 400 may further include options (not shown) to define, modify, or delete a mapping in the mapping table 124, and/or other information associated with the recipients 108.

Figure 4:
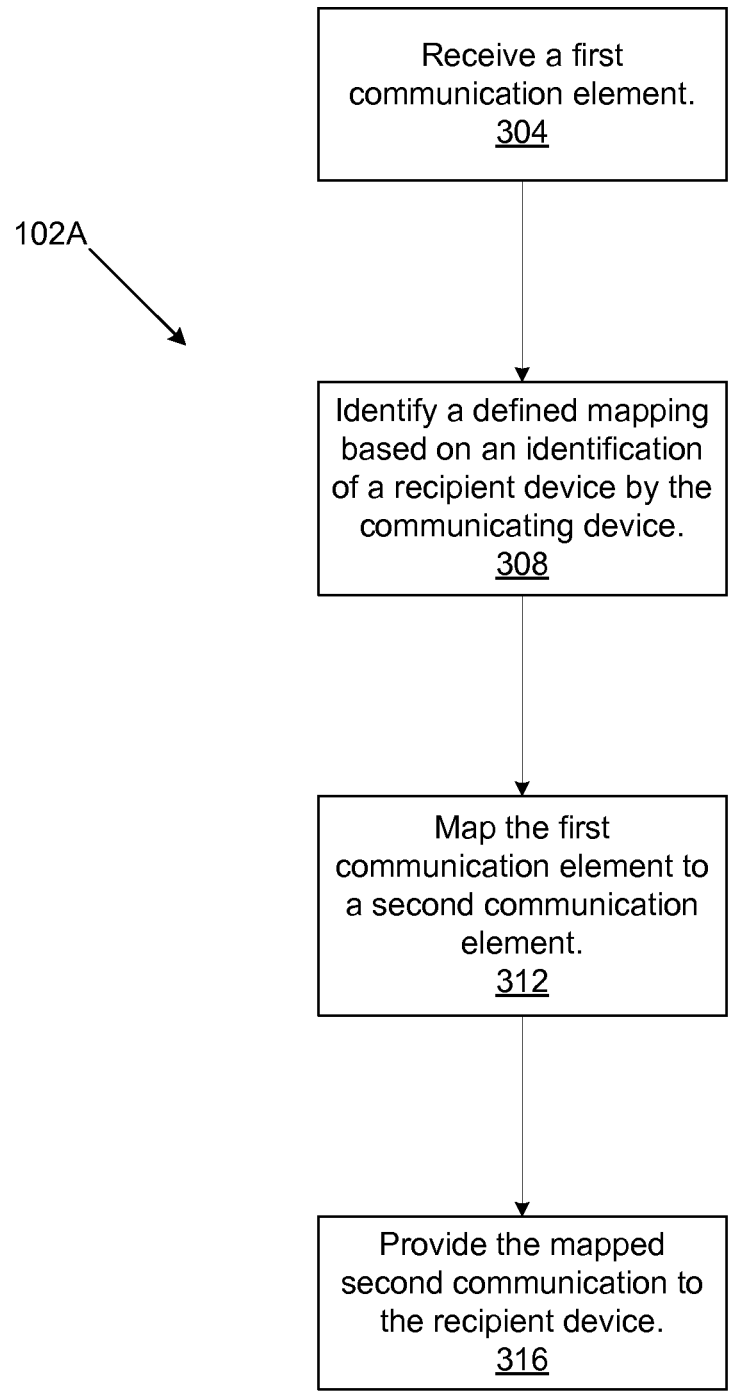
FIG. 4 is a flowchart depicting steps of a method to provide a hidden communication, according to an aspect of the present disclosure.

FIG. 4 is a flowchart depicting steps of the program 102A depicted in FIG. 1A (or the program 300 depicted in FIG. 1B) for providing a hidden communication, according to an aspect of the present disclosure. The program 102A may receive a first communication element from a communicating device, in step 304. The received first communication element may be, for example, the first communication element 316A described above (FIG. 1), and the communicating device may be the device 116A.

The program 102A may identify, in step 308, a defined mapping based on an identification of a recipient device by the communicating device. For example, the program 102A may identify that the recipient 108 and/or the device 116B have a recipient ID 150; and that this recipient ID 150 has an associated mapping table 124. In related embodiments, multiple recipient IDs 150 may be indicated by the device 116A, and one or more of them may having a corresponding mapping table 124. Groups of recipients may share one or more mapping tables 124. For example, the user 104 sending a text message (or a message belonging to any communication type) may select one or more recipients that will not receive the mapped second communication element 316B. Accordingly, some recipients may have a corresponding defined mapping criteria (i.e. a mapping table 124), and others may not.

Based on the identified defined mapping (i.e. the mapping table 124), the program 102A may map the first communication element 316A to the second communication element 316B, in step 312. The first communication element 316A and the second communication element 316B may both be, for example, a first and a second text message respectively.

According to the identified mapping of recipients and which communication element each should receive, the program 102A may provide a communication to the identified recipient(s), in step 316. The provided communication may include the first communication element and a mapping indicator; or the second communication element 316B; or both the first and second communication elements 316A/316B, as described above in connection with FIGS. 1A-B.

In related embodiments, where more than one recipient may be identified in step 308, the program 102A may provide additional communications to the recipients and/or recipient devices. The additional communications may include the first communication element 316A, the second communication element 316B, or both, depending on the mapping identified in step 308. For example, the user 104 and/or the device 116A may indicate that only the recipient 108 should receive the second communication element 316B, whereas other recipients should receive only the first communication element 116A.

Referring now to FIGS. 1A-4, according to an illustrative example, the user 104 may input "I'm OK" 228A as a text message in a text messaging application, i.e. the program 102A, on the device 116A, which may be a smart phone. "I'm OK" 228A may be the first communication element 316A, in this example. The user's 104 true intention may be to convey an entirely different message to the recipient 108 (for example, a law enforcement official) through the device 116B. The user 104 may indicate the recipient 108 or the device 116B as an intended recipient of the text message using, for example, the UI 400 (FIG. 3). This may be, for example, by selecting a "send as hidden" feature of a text messaging application 102A on the device 116A. The program 102A may identify the recipient ID 150 based on the indication by the user 104, and may identify a corresponding mapping table 124.

In the above example, the program 102A may map the text message to the second communication element 316B (e.g. a second text) "Call for Backup" 228. The program 102A may provide the second communication element 316B to the device 116B. The recipient 108 may view the second communication element 316B on the device 116B.

A similar scenario may arise where the user 104 speaks the communication 228A as a caller in distress, and the recipient 108 is an emergency response system or person. For a variety of reasons, the user 104 may wish to keep the contents of the user's 104 intention for sending a communication confidential, such that inputting (or speaking) the true message the user 104 wishes to communicate may create an undesirable effect. Using the mapping functionality of embodiments of the present disclosure, therefore, the user 104 may communicate with the recipient with greater discretion.

With continued reference to FIGS. 1-4, providing the communication to the device 116B in may vary based on several factors, including the following. As a first illustrative and non-limiting example, the provided communication may include only the second communication element (i.e. only the mapped communication).

As a second illustrative and non-limiting example, the user 104 may wish to keep the message confidential on both the device 116A and the device 116B. Accordingly, the user 104 may indicate to the program 102A on the device 116A (for example, by using an emoticon 244A or other indicator) that the first communication element 316A should be mapped prior to being provided to the recipient 108. Accordingly, the recipient 108, upon receiving the provided communication via the program 102A on the device 116B, may be notified via a discrete notification that the received communication contains a hidden coded message. The recipient 108 or the device 116B, in this embodiment, may initiate the mapping. This gives the recipient 108 an opportunity to take safeguard measures to ensure that the contents of the first communication element 316A remain confidential. For example, if the recipient 108 is in a crowded room, the recipient 108 may enter a private area and initiate a mapping request via the program 102B. In this example, where the mapping is initiated on the device 116B, the device 116B may be considered as both a user and a recipient, wherein the provided communication received by the device 116B may be referred to as a new first communication element, and a mapped communication element as a new second communication element, which may be provided to the recipient 108 as a new recipient via a third communication.

As a further illustrative and non-limiting example, the user 104 may indicate (for example, via a graphical user interface on the device 116A or via an indicator within the first communication element 316A) that the provided communication should contain both the first communication element 316A and its mapped second communication element 316B. Optionally, the provided communication may further include an indicator (whether specified by the user 104 or generated automatically by the program 102A, using the device 116A) that the provided communication contains an original coded message and its mapped equivalent. When discretely presented to the device 116B, the device 116B may first display (or otherwise produce) the first communication element 316A, and upon a selection or instruction by the device 116B (initiated by, for example, the recipient 108), display (or otherwise produce) the second communication element 316B.

Functions described as performed in response to receiving a stress indicator may be done even in the absence of a stress indicator; their performance may be triggered where the first communication element 316A maps to a second communication element 316B that falls into a predefined and/or configurable category. For example, in the Mapping Table 124 (FIG. 2), the mapped communication elements 228B, 240B, may be assigned to a "stress" or "emergency" category (not shown), that functions described above may be initiated upon the second communication element 316B being in such a category.

With continued reference to FIGS. 1-4, according to a further aspect of the present disclosure, the program 102A may provide additional communications to the device 316B and/or additional devices or recipients, wherein at least one recipient receives more information as part of the provided communication than any other recipient. This may be useful where, for example, the user 104 of the device 116A wishes to send a single first communication element 316A to multiple recipients, but wishes to indicate to only a subset of the multiple recipients that the message is coded or mapped. A selection of which recipients should receive the first communication element 316A with a mapping indicator, the second communication element 316B, or a combination thereof, and/or additional communication elements, may be set by a default value, a feature configurable via the UI 400, or through other means, for example, on the program 102 of the device 116A.

Although discussions of the various embodiments of the present disclosure have involved using these embodiments for the purpose of maintaining confidentiality, such purpose does not limit the spirit or scope of the present disclosure, and other uses are expressly contemplated.

Referring now to FIG. 5, a computing device 1000 may include respective sets of internal components 800 and external components 900. Each of the sets of internal components 800 includes one or more processors 820; one or more computer-readable RAMs 822; one or more computer-readable ROMs 824 on one or more buses 826; one or more operating systems 828; one or more software applications 829 that execute one more of the programs 300 and 102A/102B (FIG. 1); and one or more computer-readable tangible storage devices 830. The one or more operating systems 828 and software applications 829 (and/or device driver modules) are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a thin provisioning storage device, CD-ROM, DVD, SSD, memory stick, magnetic tape, magnetic disk, optical disk or semiconductor storage device. The R/W drive or interface 832 may be used to load the device driver 840 firmware, software, or microcode to tangible storage device 936 to facilitate communication with components of computing device 1000.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 1000, can be downloaded to computing device 1000 from an external computer (e.g., server) via a network (for example, the Internet, a local area network or wide area network) and respective network adapters or interfaces 836. From the network adapters (or switch port adapters) or interfaces 836 and operating system 828 associated with computing device 1000 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The communicating device 116A, the recipient device 116B, and/or the server 120 (FIG. 1) may each be a device 1000 having one or more components as described in connection with FIG. 5, above.

Figure 6:
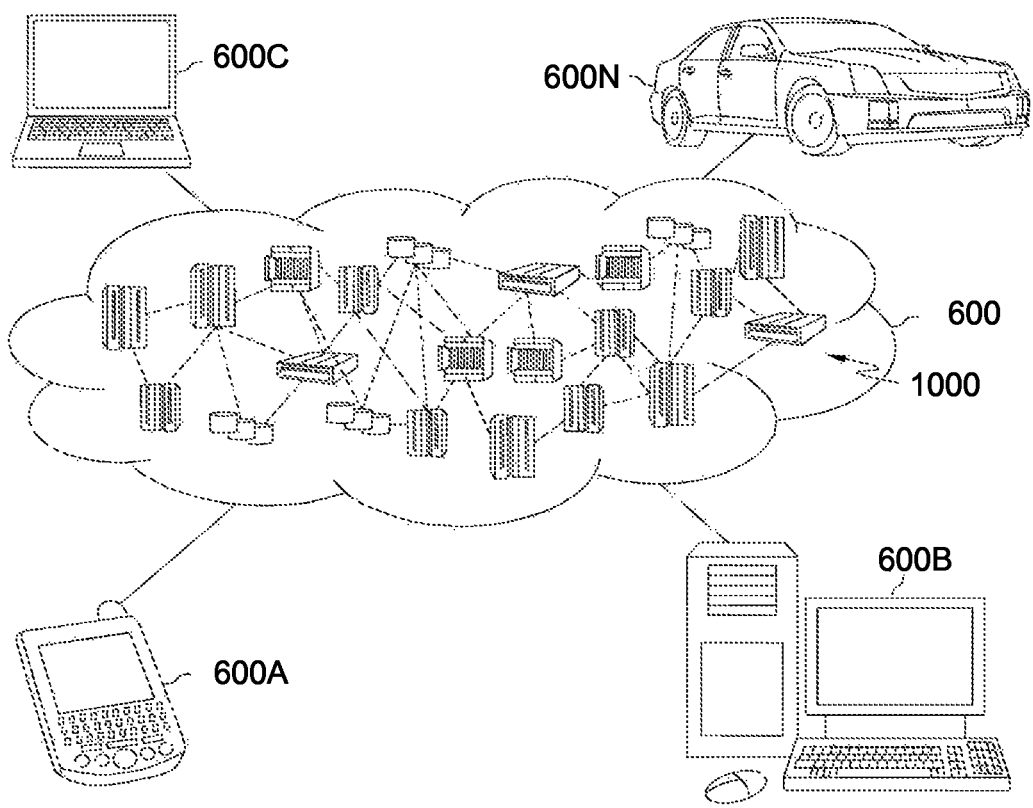
FIG. 6 is a block diagram of an illustrative cloud computing environment, according to an aspect of the present disclosure.

Referring now to FIG. 6, an illustrative cloud computing environment 600 is depicted. As shown, the cloud computing environment 600 comprises one or more cloud computing nodes, each of which may be a system 1000 with which local computing devices used by cloud consumers, such as, for example, a personal digital assistant (PDA) or a cellular telephone 600A, a desktop computer 600B, a laptop computer 600C, and/or an automobile computer system 600N, may communicate. The nodes 1000 may communicate with one another. They may be grouped (not shown) physically or virtually, in one or more networks, such as Private, Community, Public, or Hybrid clouds as described hereinabove, or a combination thereof. This allows the cloud computing environment 600 to offer infrastructure, platforms and/or software as services for which a cloud consumer does not need to maintain resources on a local computing device. It is understood that the types of computing devices 600A-N shown in FIG. 6 are intended to be illustrative only and that the computing nodes 1000 and the cloud computing environment 600 can communicate with any type of computerized device over any type of network and/or network addressable connection (e.g., using a web browser). Furthermore, each of the devices 116A/116B (FIG. 1) may be any one of the devices depicted in FIGS. 5-6.

Figure 7:
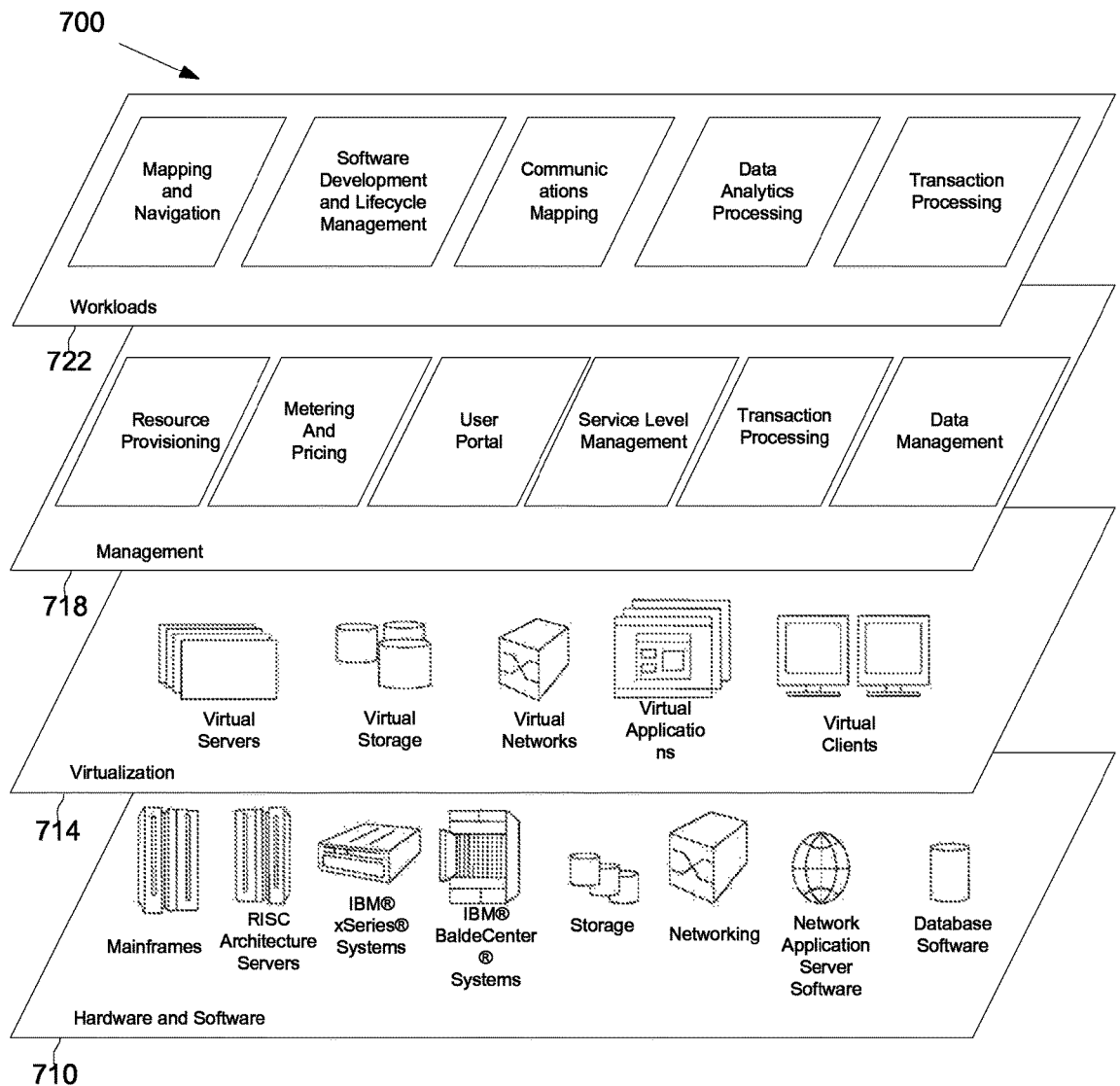
FIG. 7 is a block diagram of functional layers of the illustrative cloud computing environment of FIG. 6, according to an aspect of the present disclosure.

Referring now to FIG. 7, a set of functional abstraction layers provided by the cloud computing environment 700 (FIG. 6) is shown. It should be understood in advance that the components, layers, and functions shown in FIG. 7 are intended to be illustrative only and embodiments of the invention are not limited thereto. As depicted, the following layers and corresponding functions are provided.

The hardware and software layer 710 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

The virtualization layer 714 provides an abstraction layer from which the following examples of virtual entities may be provided: virtual servers; virtual storage; virtual networks, including virtual private networks; virtual applications and operating systems; and virtual clients.

In one example, the management layer 718 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

The workloads layer 722 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a communications mapping component that provides the functionality provided by embodiments of the present disclosure described in FIGS. 1-4.

While aspects of the present invention are particularly shown and described with respect to preferred embodiments thereof, it will be understood by those skilled in the art that changes in forms and details may be made to these embodiments without departing from the spirit and scope of the present invention. It is therefore intended that the present disclosure not be limited to the exact forms and details described and illustrated herein, but falls within the scope of the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A computer implemented method for providing a hidden communication, the method comprising:
    receiving a first communication element in a computerized communications application of a communicating device, the first communication element comprising a stress indicator element and at least one of a coded message or an indicator that the first communication element should be coded,
    wherein a media type of the stress indicator element is selected from the group consisting of text, audio and video, and
    wherein the stress indicator element triggers a stress response selected from the group consisting of placing a call to an emergency operator, sending global positioning satellite (GPS) coordinates of the communicating device to a recipient device, and sending GPS coordinates of the communicating device to the emergency operator;
    receiving an instruction, by the communication device, to communicate the first communication element as a hidden message;
    identifying, based on receiving the instruction, a defined hidden communication mapping based on an identification of a recipient device,
    wherein the defined hidden communication mapping comprises an association between a first content of the first communication element and a second content of a second communication element, the hidden communication mapping causing the meaning of the first communication element to be hidden,
    wherein the first content is different than the second content, and the second communication comprises at least one of a coded form or a decoded form of the first communication element;
    wherein a media type indicator is included in the defined communication mapping, indicating a mapping of the media type of the first communication element and the second communication element,
    mapping the first communication element to the second communication element based on the defined mapping and the included media type indicator; and
    providing the second communication element to the recipient device.

2. The method of claim 1, further comprising:
    providing an indicator to the recipient device that the second communication element is a mapped communication element.

3. The method of claim 1, wherein one or both of the first communication element and the second communication element includes one or more of: a text-based communication type, an audio-based communication type, a video-based communication type, or a graphics-based communication type.

4. The method of claim 1, further comprising:
    activating a functionality of the communicating device in response to receiving the first communication element; and
    providing data associated with the activated functionality to the recipient device, wherein the activated functionality includes one or more of: an audio recording functionality, a video recording functionality, a text tracking functionality, a screen capture functionality, or global positioning satellite (GPS) tracking functionality.

5. The method of claim 1, further comprising:
    providing an additional communication to a second recipient device, wherein the additional communication includes the first communication element but does not include the second communication element.

6. The method of claim 1, wherein the first communication element includes a distress indicator; and the method further comprises:

initiating a response by the recipient device in response to receiving the first communication element, wherein the response includes initiating a further communication to an emergency operator.

7. The method of claim 1, wherein:
identifying a defined mapping further comprises identifying a plurality of defined mappings based on an identification of a plurality of recipient device groups;
mapping the first communication element further comprises, mapping the first communication element, for each of the plurality of recipient device groups, to a corresponding second communication element; and
providing the second communication element further comprises providing each recipient device group with a corresponding third communication element, wherein the corresponding third communication element includes the first communication element or the corresponding second communication element.

8. The method of claim 3, wherein:
the text-based communication type includes one or more of: an email, an instant message, a status update on a social network existing on one or more computers, or a text message (SMS);
the audio-based communication type includes one or more of: a voicemail or a phone call;
the video-based communication type includes one or more of: a video message or a video stream; and
the graphics-based communication type includes one or more of: a digital image or a graphics symbol.

9. A computer system for providing a hidden communication, the computer system comprising:
a computer having a processor and a computer-readable storage device; and
program code embodied on the storage device for execution by the processor to perform a method comprising:
receiving, by the processor, a first communication element in a computerized communications application of a communicating device, the first communication element comprising a stress indicator element and at least one of a coded message or an indicator that the first communication element should be coded;
wherein a media type of the stress indicator element is selected from the group consisting of text, audio and video, and
wherein the stress indicator element triggers a stress response selected from the group consisting of placing a call to an emergency operator, sending global positioning satellite (GPS) coordinates of the communicating device to a recipient device, and sending GPS coordinates of the communicating device to the emergency operator;
receiving an instruction, by the communication device, to communicate the first communication element as a hidden message;
identifying, by the processor, based on receiving the instruction, a defined hidden communication mapping based on an identification of a recipient device,
wherein the defined hidden communication mapping comprises an association between a first content of the first communication element and a second content of a second communication element, the hidden communication mapping causing the meaning of the first communication element to be hidden,
wherein the first content is different than the second content, and the second communication comprises at least one of a coded form or a decoded form of the first communication element;

wherein a media type indicator is included in the defined communication mapping, indicating a mapping of the media type of the first communication element and the second communication element,
mapping, by the processor, the first communication element to the second communication element based on the defined mapping and the included media type indicator; and
providing, by the processor, the second communication element to the recipient device.

10. The system of claim 9, wherein the method further comprises:
activating, by the processor, a functionality of the communicating device in response to receiving the first communication element; and
providing, by the processor, data associated with the activated functionality to the recipient device, wherein the activated functionality includes one or more of: an audio recording functionality, a video recording functionality, a text tracking functionality, a screen capture functionality, or a global positioning satellite (GPS) tracking functionality.

11. The system of claim 9, wherein the computer system is a mobile device.

12. The system of claim 9, wherein the computer system is a tablet.

13. The system of claim 9, wherein the first communication element is received via a touch screen.

14. The system of claim 9, wherein the first communication element is received via a microphone.

15. A computer program product for providing a hidden communication, comprising a computer-readable storage device having program code embodied therewith, the program code executable by a processor to perform a method comprising:
receiving, by the processor, a first communication element in a computerized communications application of a communicating device the first communication element comprising a stress indicator element and at least one of a coded message or an indicator that the first communication element should be coded;
wherein a media type of the stress indicator element is selected from the group consisting of text, audio and video, and
wherein the stress indicator element triggers a stress response selected from the group consisting of placing a call to an emergency operator, sending global positioning satellite (GPS) coordinates of the communicating device to a recipient device, and sending GPS coordinates of the communicating device to the emergency operator;
receiving an instruction, by the communication device, to communicate the first communication element as a hidden message;
identifying, by the processor, based on receiving the instruction, a defined hidden communication mapping based on an identification of a recipient device,
wherein the defined hidden communication mapping comprises an association between a first content of the first communication element and a second content of a second communication element, the hidden communication mapping causing the meaning of the first communication element to be hidden,
wherein the first content is different than the second content, and the second communication comprises at least one of a coded form or a decoded form of the first communication element;

wherein a media type indicator is included in the defined communication mapping, indicating a mapping of the media type of the first communication element and the second communication element, mapping, by the processor, the first communication element to a second communication element based on the defined mapping and the included media type indicator; and providing, by the processor, the second communication element to the recipient device.

16. The computer program product of claim 15, wherein the method further comprises:

providing, by the processor, the first communication element and a mapping indicator to the recipient device.

17. The computer program product of claim 15, wherein the method further comprises:

providing, by the processor, an additional communication to an additional recipient device, wherein the additional communication includes the first communication element but does not include the second communication element.

18. The computer program product of claim 15, wherein the method further comprises:

initiating, by the processor, a response in response to receiving the first communication element, wherein the response includes initiating a further communication to an emergency operator.

* * * * *